United States Patent
Kolter et al.

(10) Patent No.: US 11,455,515 B2
(45) Date of Patent: Sep. 27, 2022

(54) EFFICIENT BLACK BOX ADVERSARIAL ATTACKS EXPLOITING INPUT DATA STRUCTURE

(71) Applicant: Robert Bosch GmbH, Stuttgart (DE)

(72) Inventors: Jeremy Zieg Kolter, Pittsburgh, PA (US); Anit Kumar Sahu, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 16/580,650

(22) Filed: Sep. 24, 2019

(65) Prior Publication Data

US 2021/0089866 A1 Mar. 25, 2021

(51) Int. Cl.
*G06N 3/04* (2006.01)
*G06T 7/00* (2017.01)

(52) U.S. Cl.
CPC ......... *G06N 3/0454* (2013.01); *G06T 7/0002* (2013.01); *G06T 2207/20084* (2013.01)

(58) Field of Classification Search
CPC ............... G06N 3/0454; G06T 7/0002; G06T 2207/20084
See application file for complete search history.

(56) References Cited

U.S. PATENT DOCUMENTS

| | | | | |
|---|---|---|---|---|
| 2019/0130110 | A1* | 5/2019 | Lee | G06F 21/57 |
| 2019/0225234 | A1* | 7/2019 | Kumar | B60W 50/0205 |
| 2020/0265271 | A1* | 8/2020 | Zhang | G06K 9/6262 |
| 2020/0284883 | A1* | 9/2020 | Ferreira | G01S 17/894 |
| 2020/0394512 | A1* | 12/2020 | Zhang | G06N 3/04 |
| 2022/0108215 | A1* | 4/2022 | Choromanski | G06N 3/006 |
| 2022/0126864 | A1* | 4/2022 | Moustafa | B60W 40/09 |

OTHER PUBLICATIONS

Bhambri, Siddhant, et al. "A survey of black-box adversarial attacks on computer vision models." arXiv preprint arXiv:1912.01667 (2019). (Year: 2019).*

Narodytska, Nina, and Shiva Prasad Kasiviswanathan. "Simple Black-Box Adversarial Attacks on Deep Neural Networks." CVPR Workshops. vol. 2. 2017. (Year: 2017).*

(Continued)

*Primary Examiner* — Yu Chen

(74) *Attorney, Agent, or Firm* — Brooks Kushman P.C.

(57) ABSTRACT

Markov random field parameters are identified to use for covariance modeling of correlation between gradient terms of a loss function of the classifier. A subset of images are sampled, from a dataset of images, according to a normal distribution to estimate the gradient terms. Black-box gradient estimation is used to infer values of the parameters of the Markov random field according to the sampling. Fourier basis vectors are generated from the inferred values. An original image is perturbed using the Fourier basis vectors to obtain loss function values. An estimate of a gradient is obtained from the loss function values. An image perturbation is created using the estimated gradient. The image perturbation is added to an original input to generate a candidate adversarial input that maximizes loss in identifying the image by the classifier. The neural network classifier is queried to determine a classifier prediction for the candidate adversarial input.

20 Claims, 2 Drawing Sheets

(56) References Cited

OTHER PUBLICATIONS

Ilyas et al., Black-box Adversarial Attacks with Limited Queries and Information, 35th International Conference on Machine Learning, Stockholm, Sweden, Jul. 2018.

Ilyas et al., Prior Convictions: Black-Box Adversarial Attacks With Bandits and Priors, 7th International Conference on Learning Representations, New Orleans, LA, May 2019.

Moon et al., Parsimonious Black-Box Adversarial Attacks via Efficient Combinatorial Optimization, 36th International Conference on Machine Learning, Long Beach, CA, Jun. 2019.

\* cited by examiner

EFFICIENT BLACK BOX ADVERSARIAL ATTACKS EXPLOITING INPUT DATA STRUCTURE

TECHNICAL FIELD

The present disclosure relates to attacking classifiers based on deep neural networks in an adversarial fashion, and more specifically, to efficient black-box adversarial attacks exploiting the structure of the input data to the classifier.

BACKGROUND

Black box adversarial attacks are an active area of research. The following three references each describe approaches to crafting black box adversarial examples. An approach using natural evolution strategies is found in Ilyas, A., Engstrom, L., Athalye, A., & Lin, J. (2018, July). Black-box Adversarial Attacks with Limited Queries and Information, published in *International Conference on Machine Learning*. arXiv: 1804.08598. This reference defines three realistic threat models that more accurately characterize many real-world classifiers: the query-limited setting, the partial information setting, and the label-only setting. The reference develops new attacks that fool classifiers under these more restrictive threat models, where previous methods would be impractical or ineffective. The reference demonstrates that our methods are effective against an ImageNet classifier under our proposed threat models. The reference also demonstrates a targeted black-box attack against a commercial classifier, overcoming the challenges of limited query access, partial information, and other practical issues to break the Google Cloud Vision API.

An approach that estimates the gradient with gradient priors, and then performs gradient descent, is found in Ilyas, A., Engstrom, L., & Madry, A. (2018). Prior convictions: Black-box adversarial attacks with bandits and priors. arXiv preprint arXiv: 1807.07978. This reference studies the problem of generating adversarial examples in a black-box setting in which only loss-oracle access to a model is available. The reference introduces a framework that conceptually unifies much of the existing work on black-box attacks, and demonstrates that the current state-of-the-art methods are optimal in a natural sense. Despite this optimality, the reference shows how to improve black-box attacks by bringing a new element into the problem: gradient priors. The reference gives a bandit optimization-based algorithm that allows to seamlessly integrate any such priors, and explicitly identifies and incorporates two examples.

An approach that uses submodular optimization may be found in Moon, S., An, G., & Song, H. O. (2019). Parsimonious Black-Box Adversarial Attacks via Efficient Combinatorial Optimization. arXiv preprint arXiv: 1905.06635. The reference proposes an efficient discrete surrogate to the optimization problem which does not require estimating the gradient and consequently becomes free of the first order update hyperparameters to tune. The experiments on Cifar-10 and ImageNet show the black-box attack performance with significant reduction in the required queries compared to a number of recently proposed methods.

SUMMARY

According to one or more illustrative examples, a method for performing a single-step adversarial attack on a neural network classifier, includes identifying Markov random field parameters to use for covariance modeling of correlation between gradient terms of a loss function of the classifier; sampling a subset of images, from a dataset of images, according to a normal distribution to estimate the gradient terms; using black-box gradient estimation to infer values of the parameters of the Markov random field according to the sampling; generating Fourier basis vectors from the inferred values; perturbing an original image using the Fourier basis vectors to obtain loss function values; obtaining an estimate of a gradient from the loss function values; creating an image perturbation using the estimated gradient; adding the image perturbation to an original input to generate a candidate adversarial input that maximizes loss in identifying the image by the classifier; querying the neural network classifier to determine a classifier prediction for the candidate adversarial input; computing a score for the classifier prediction; and accepting the candidate adversarial input as a successful adversarial attack responsive to the classifier prediction being incorrect.

The method may further include adding the image perturbation to the original input using a fast gradient sign method. The method may further include wherein the fast gradient sign method utilizes a pre-specified $L_\infty$ perturbation bound to adding the image perturbation to the original input.

The method may further include wherein the Markov random field parameters include a first parameter that governs diagonal terms, and a second parameter that governs adjacent pixels corresponding to indices that are neighboring in an image.

The method may further include wherein the values of the parameters are inferred using Newton's method. The method may further include wherein a predefined maximum number of queries of the classifier are utilized to estimate the gradients. The method may further include wherein the images include video image data. The method may further include wherein the images include still image data.

According to one or more illustrative examples, a computational system for performing a single-step adversarial attack on a neural network classifier includes a memory storing instructions of black box adversarial attack algorithms of a software program; and a processor programmed to execute the instructions to perform operations including to identify Markov random field parameters to use for covariance modeling of correlation between gradient terms of a loss function of the classifier; sample a subset of images, from a dataset of images, according to a normal distribution to estimate the gradient terms; use black-box gradient estimation to infer values of the parameters of the Markov random field according to the sampling; generate Fourier basis vectors from the inferred values; perturb an original image using the Fourier basis vectors to obtain loss function values; obtain an estimate of a gradient from the loss function values; create an image perturbation using the estimated gradient; add the image perturbation to an original input to generate a candidate adversarial input that maximizes loss in identifying the image by the classifier; query the neural network classifier to determine a classifier prediction for the candidate adversarial input; compute a score for the classifier prediction; accept the candidate adversarial input as a successful adversarial attack responsive to the classifier prediction being incorrect; and reject the candidate adversarial input responsive to the classifier prediction being correct.

The computational system may be further programmed to add the image perturbation to the original input using a fast gradient sign method. The computational system may further include wherein the fast gradient sign method utilizes a pre-specified $L_\infty$ perturbation bound to adding the image perturbation to the original input.

The computational system may further include wherein the Markov random field parameters include a first parameter that governs diagonal terms, and a second parameter that governs adjacent pixels corresponding to indices that are neighboring in an image. The computational system may further include wherein the values of the parameters are inferred using Newton's method. The computational system may further include wherein a predefined maximum number of queries of the classifier are utilized to estimate the gradients.

According to one or more illustrative examples, a non-transitory computer-readable medium includes instructions for performing a single-step adversarial attack on a neural network classifier that that, when executed by a processor, cause the processor to identify Markov random field parameters to use for covariance modeling of correlation between gradient terms of a loss function of the classifier; sample a subset of images, from a dataset of images, according to a normal distribution to estimate the gradient terms; use black-box gradient estimation to infer values of the parameters of the Markov random field according to the sampling; generate Fourier basis vectors from the inferred values; perturb an original image using the Fourier basis vectors to obtain loss function values; obtain an estimate of a gradient from the loss function values; create an image perturbation using the estimated gradient; add the image perturbation to an original input to generate a candidate adversarial input that maximizes loss in identifying the image by the classifier; query the neural network classifier to determine a classifier prediction for the candidate adversarial input; compute a score for the classifier prediction; accept the candidate adversarial input as a successful adversarial attack responsive to the classifier prediction being incorrect; and reject the candidate adversarial input responsive to the classifier prediction being correct.

The medium may further include instructions that, when executed by the processor, cause the processor to add the image perturbation to the original input using a fast gradient sign method. The medium may further include wherein the fast gradient sign method utilizes a pre-specified $L_\infty$ perturbation bound to adding the image perturbation to the original input.

The medium may further include wherein the Markov random field parameters include a first parameter that governs diagonal terms, and a second parameter that governs adjacent pixels corresponding to indices that are neighboring in an image. The medium may further include wherein the values of the parameters are inferred using Newton's method. The medium may further include wherein a predefined maximum number of queries of the classifier are utilized to estimate the gradients.

DETAILED DESCRIPTION

Figure 1:
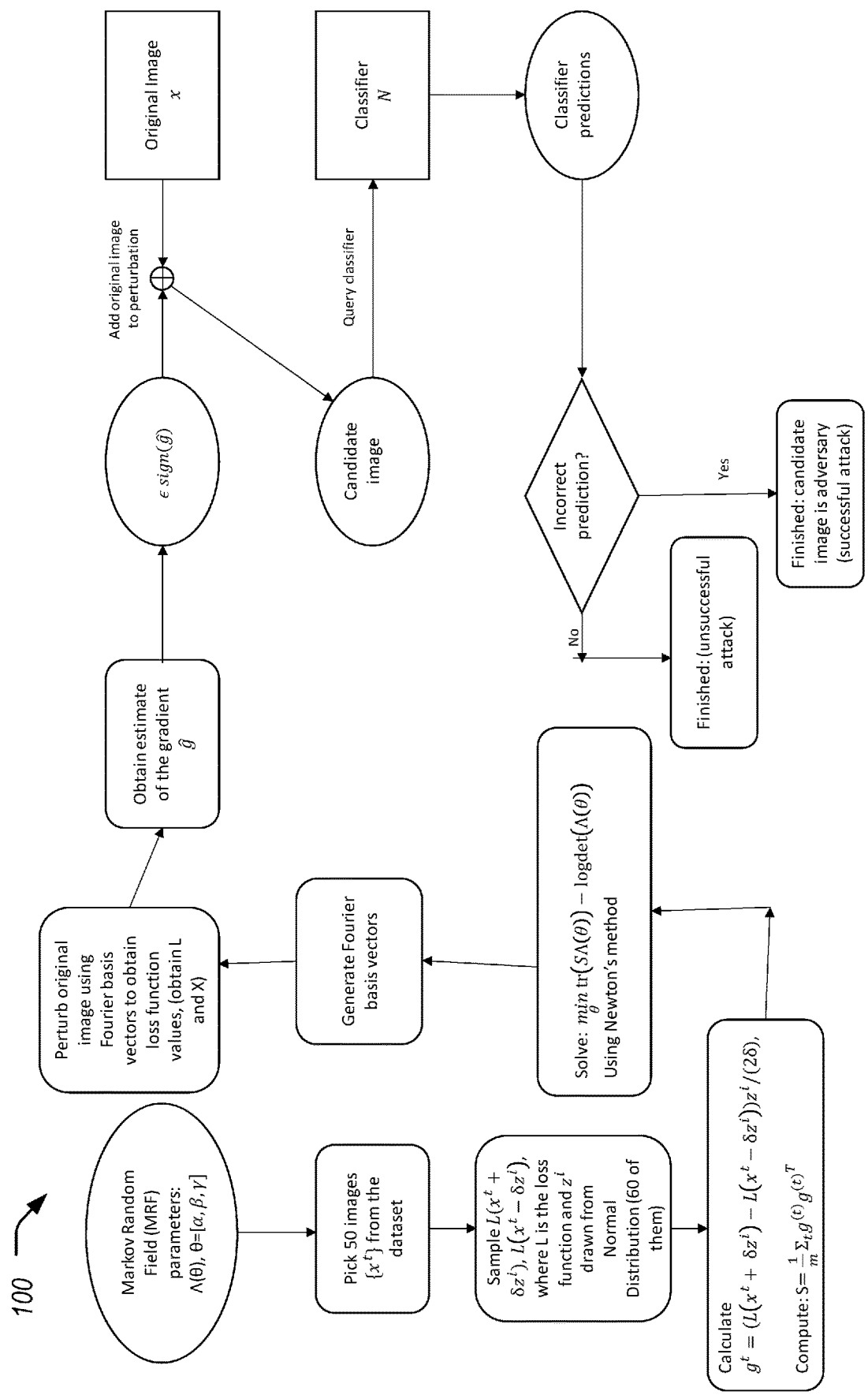
FIG. 1 is an example data flow diagram for performing single-step black box adversarial attacks.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure relates to attacking classifiers, based on deep neural networks, in an adversarial fashion. The method takes an input image and adds a perturbation to the image such that the perturbed image has minimal visual distortion to the human eye with respect to the original image. However, the perturbed image causes the deep neural network-based classifier to misclassify the image. The notion of minimal distortion is formalized by requiring that the perturbation be bounded in $L_\infty$ norm by a pre-specified maximum value E.

Adversarial attacks can be categorized into two classes, namely, white box attacks, where it is assumed that one has full knowledge of the neural network and the associated parameters, and black box attacks, where none of the aforementioned information is available. Furthermore, the category of black box attacks can be further subcategorized into multi-step and single-step attacks. In a multi-step attack, the perturbations are generated over multiple iterations, while in a single-step attack, the perturbation is generated in just one iteration. This disclosure relates specifically to single-step black box attacks, which are significantly different in implementation compared to multi-step attacks.

In the black box attack setting, obtaining information about the model involves querying the model, i.e., providing an input to the model and obtaining a prediction of a class or a probability distribution over classes. In a real-world attack scenario, it is unrealistic to assume that a model may be queried as much as one would like. Thus, in realistic settings the available number of queries is limited. Thus, a fixed query budget may be ascertained for evaluation of a black box adversarial attack scheme. As described herein, the disclosure relates to maximizing the percentage of images that are misclassified for a given query budget using a single iteration of queries.

The techniques used in this disclosure include parametric inverse covariance estimation using Gaussian Markov random fields and the Fast Gradient Signed Method. The approach in this disclosure is capable of achieving higher attack accuracy relative to existing approaches, while crafting the perturbation in just one step as opposed to multiple steps in other solutions. The disclosed approaches may accordingly be used to check for vulnerabilities for deployable deep learning models. As another application, the disclosed approaches may be used to generate data for adversarial training of deep neural networks to improve the robustness of the model. Thus, the computer system, computer-readable medium, and method aspects disclosed herein provide a non-abstract, technological improvement over known approaches for identifying model weaknesses as well as addressing those weaknesses.

FIG. 1 illustrates an example data flow diagram for performing single-step black box adversarial attacks. With reference to FIG. 1, in many black-box attacks, the gradient terms (of the loss with respect to the input image) are implicitly assumed to be independent from one other. However, when inspecting adversarial examples visually, it may be apparent that this is not the case. Gradient terms can be heavily correlated. The disclosed approaches exploit this correlation to construct query-efficient black-box adversarial attacks.

Formally, let x be the input to a deep classifier, and let $g = \nabla L(x)$ the gradient of the associated gradient with respect to the loss function that is being estimated. Then, a prior distribution is placed over g as shown in Equation (1):

$$g \sim \mathcal{N}(0, \Sigma), \quad (1)$$

where $\Sigma$ is some (non-identity) covariance modeling the correlation between terms. The inverse covariance matrix may be modeled as follows:

$$\Lambda = \Sigma^{-1},$$

a setting also known as the Gaussian Markov random field setting, where the non-zero entries of $\Lambda$ correspond exactly to the edges in a graphical model describing the distribution. In general, vertices in a Gaussian Markov random field stand for random variables and the edges impose statistical constraints on those random variables.

Figure 2:
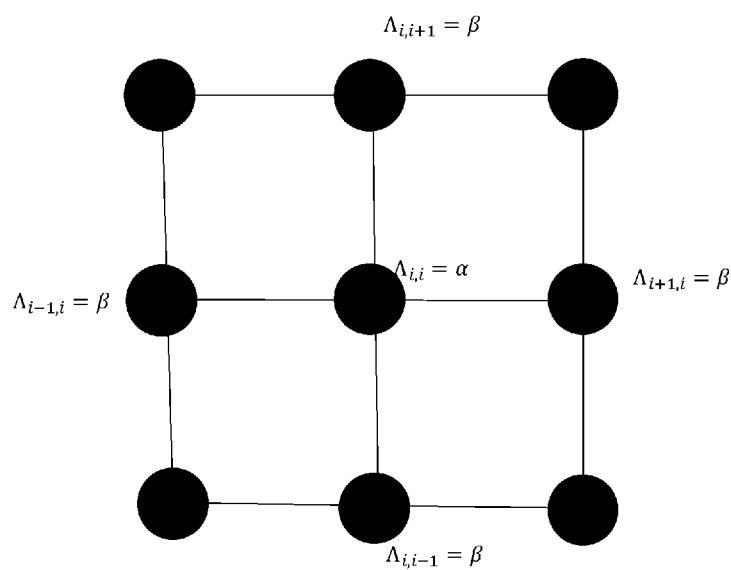
FIG. 2 is an example of parameters of a two-dimensional image.

A parametrized Gaussian Markov random field may be used with relatively few free parameters. As shown in FIG. 2 as an example of parameters, if x is a 2-dimensional image (e.g., 2 channels: black and white) then there is one parameter $\alpha$ governing the diagonal terms $\Lambda_{i,i} = \alpha$ for all i, and another governing adjacent pixels $\Lambda_{i,j} = \beta$ for i, j corresponding to indices that are neighboring in the original image. All parameters of this model may be referred to as $\theta$ so in this case $\theta = (\alpha, \beta)$. The resulting $\Lambda$ may be referred to as $\Lambda(\theta)$. For a 3-dimensional image (e.g., with 3 channels: red, blue, and green), additional parameters may be used to capture the relationship of pixels in other channels. In order to infer the parameters, the following optimization problem may be solved using the Newton method as shown in Equation (2):

$$\min_{\theta} tr(S\Lambda(\theta)) - \log\det(\Lambda(\theta)), \quad (2)$$

where $$S = \frac{1}{m} \sum_i g^{(i)} g^{(i)T}$$

is the sample covariance of the gradient samples $g^i$'s. In order to sample the gradients, $$g^i = \frac{L(x^i + \delta u) - L(x^i + \delta u)}{2\delta} u$$

is used, where u's are drawn from a normal distribution, $\mathcal{N}(0,1)$ and $x^i$'s are input images. In one non-limiting example, 50 images from the dataset and 50 draws from the normal distribution may be used to estimate the gradients so as to be used in (2). In Newton's method, at every step the iterate may be updated by:

$$\theta^{t+1} = \theta^t - \eta (\nabla^2(L(\theta^t)))^{-1} \nabla(L(\theta^t)),$$

where $\theta^t$ is the iterate at iteration t and $\nabla^2(L(\theta^t))$ is the Hessian.

In order to compute the objective in Equation (2) efficiently, techniques from circular convolution and a fast Fourier transform are used. Under this framework, black-box gradient estimation is interpreted as a Gaussian inference problem with the prior imposed in Equation (1), and then, using the fact that the loss function value at some point x' is a noisy observation of the gradient:

$$L(x') \approx L(x) + g^T(x' - x).$$

Thus, given a set of sample points $x^{(1)}, \ldots, x^{(m)}$ which is basically utilizing m queries and their corresponding function values $L(x^{(1)}), \ldots, L(x^{(m)})$ the distribution $f|L \sim \mathcal{N}(Xg, \sigma^2 I)$ is indicated, where:

$$L = \begin{pmatrix} L(x^{(1)}) - L(x) \\ \vdots \\ L(x^{(m)}) - L(x) \end{pmatrix}, X = \begin{pmatrix} (x^{(1)} - x)^T \\ \vdots \\ (x^{(m)} - x)^T \end{pmatrix}$$

and the expected value of the posterior distribution is given by Equation (3):

$$\hat{g} = E[g|L] = \frac{\left(\Lambda + \frac{X^T X}{\sigma^2}\right)^{-1} X^T L}{\sigma^2} \quad (3)$$

In particular, eigenvectors are used of the inverse covariance matrix, $\Lambda$ to perturb the images, which in this case happen to be the Fourier basis vectors. Note that, the m queries drawn are in accordance to the query budget. Query budget denotes the maximum allowable number of queries that can be used to attack an image.

In order to avoid the possibly cumbersome inverse in Equation (3), Woodbury's Matrix Identity may be used to yield:

$$\left(\Lambda + \frac{1}{\sigma^2} X^T X\right)^{-1} = \Lambda^{-1} - \Lambda^{-1} X^T (\sigma^2 I + X \Lambda^{-1} X^T)^{-1} X \Lambda^{-1}$$

Using the expected value of the gradient in (3), as the gradient estimate, the adversarial image may be generated as follows using the Fast Gradient Sign Method:

$$\hat{x} = x + \epsilon \, \text{sig n}(\hat{g}),$$

where $\epsilon$ is the pre-specified $L_\infty$ perturbation bound. The Fast Gradient Sign Method operates by using the estimated gradients $\hat{g}$ of N to create an adversarial example $\hat{x}$ from input image x. (The sign function gives a value of 1 for positive numbers, a value of −1 for negative numbers, and a value of zero for zero.) Using the input image, the method uses the estimated gradients of the loss with respect to the input image to create a new image that maximizes the loss. This new image may be referred to as an adversarial image. As noted herein, the objective is to find a perturbation of image x as $\hat{x}$, where $\hat{x}$ will be misclassified by N.

Suppose N is a classifier for a K-class classification problem. For a soft-label output, the output of the neural network N is a K-dimensional vector, and the predicted class is the index of the largest value of N(x), given by $$\underset{k=1,\ldots,K}{\mathrm{argmax}}\ N(x)_k.$$

When x is classified correctly by N, let predicted class $$y = \underset{k=1,\ldots,K}{\mathrm{argmax}}\ N(x)_k.$$

In another example, the network outputs only the predicted class (i.e., only the index of the largest class of the soft-label output). The method can be adapted for the hard label case by using the objective function $f(\delta)=1$ if N predicts class y, and 0 otherwise.

If the image $\hat{x}$ results in the deep network-based classifier N generating a score $\ell_t \leftarrow f(\delta_t)$ for $\hat{x}$ that misclassifies $\hat{x}$ (e.g., $\ell_t=0$), then a successful attack is indicated. Otherwise, if the image $\hat{x}$ is not misclassified, then the attack was unsuccessful.

Variations on the described approach are possible. In one example variation, a Laplacian prior can be used instead of a Gaussian prior in Equation (1). Moreover, the above description is specifically applicable to image domains, as x was specifically assumed to be an image. It should be noted that the disclosed approach may be extended to video where the data exhibits similar structure to those of images.

Figure 3:
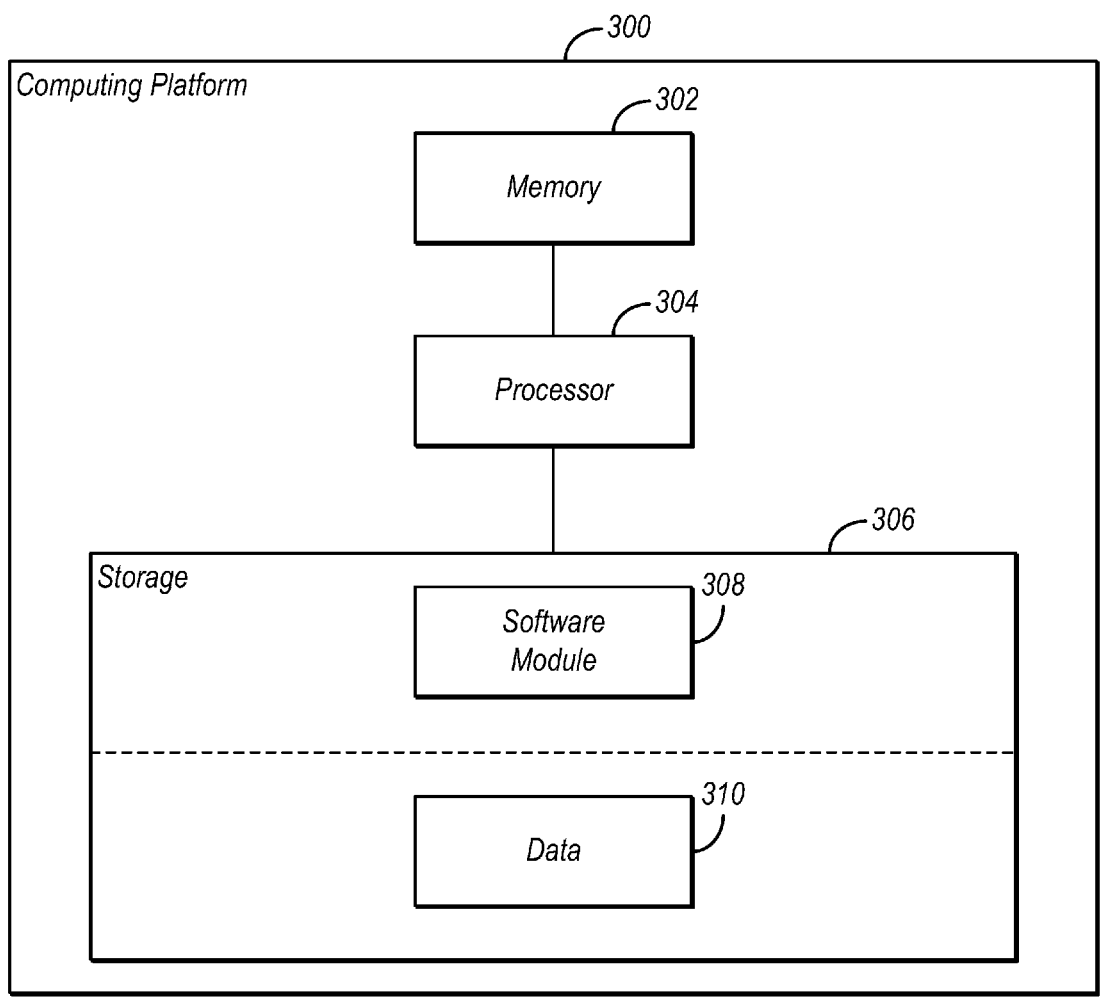
FIG. 3 is a schematic diagram of a computing platform that may be utilized to implement the single-step black box adversarial attacks.

The algorithms and/or methodologies of one or more embodiments are implemented using a computing platform, as shown in FIG. 3. The computing platform 300 may include memory 302, processor 304, and non-volatile storage 306. The processor 304 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 302. The memory 302 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 306 may include one or more persistent data storage devices such as a hard drive, optical drive, tape drive, non-volatile solid-state device, cloud storage or any other device capable of persistently storing information.

The processor 304 may be configured to read into memory 302 and execute computer-executable instructions residing in software module 308 of the non-volatile storage 306 and embodying algorithms and/or methodologies of one or more embodiments. The software module 308 may include operating systems and applications. The software modules 308 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by the processor 304, the computer-executable instructions of the software module 308 may cause the computing platform 300 to implement one or more of the algorithms and/or methodologies disclosed herein. The non-volatile storage 306 may also include data 310 supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for performing a single-step adversarial attack on a neural network classifier, comprising:
identifying Markov random field parameters to use for covariance modeling of correlation between gradient terms of a loss function of the classifier;
sampling a subset of images, from a dataset of images, according to a normal distribution to estimate the gradient terms;
using black-box gradient estimation to infer values of the parameters of the Markov random field according to the sampling;
generating Fourier basis vectors from the inferred values;
perturbing an original image using the Fourier basis vectors to obtain loss function values;
obtaining an estimate of a gradient from the loss function values;
creating an image perturbation using the estimated gradient;
adding the image perturbation to an original input to generate a candidate adversarial input that maximizes loss in identifying the image by the classifier;
querying the neural network classifier to determine a classifier prediction for the candidate adversarial input;
computing a score for the classifier prediction; and
accepting the candidate adversarial input as a successful adversarial attack responsive to the classifier prediction being incorrect.

2. The method of claim 1, further comprising adding the image perturbation to the original input using a fast gradient sign method.

3. The method of claim 2, wherein the fast gradient sign method utilizes a pre-specified $L_\infty$ perturbation bound to adding the image perturbation to the original input.

4. The method of claim 1, wherein the Markov random field parameters include a first parameter that governs diagonal terms, and a second parameter that governs adjacent pixels corresponding to indices that are neighboring in an image.

5. The method of claim 1, wherein the values of the parameters are inferred using Newton's method.

6. The method of claim 1, wherein a predefined maximum number of queries of the classifier are utilized to estimate the gradients.

7. The method of claim 1, wherein the images include video image data.

8. The method of claim 1, wherein the images include still image data.

9. A computational system for performing a single-step adversarial attack on a neural network classifier, the system comprising:
a memory storing instructions of black box adversarial attack algorithms of a software program; and
a processor programmed to execute the instructions to perform operations including to
identify Markov random field parameters to use for covariance modeling of correlation between gradient terms of a loss function of the classifier;
sample a subset of images, from a dataset of images, according to a normal distribution to estimate the gradient terms;
use black-box gradient estimation to infer values of the parameters of the Markov random field according to the sampling;
generate Fourier basis vectors from the inferred values;
perturb an original image using the Fourier basis vectors to obtain loss function values;
obtain an estimate of a gradient from the loss function values;
create an image perturbation using the estimated gradient;
add the image perturbation to an original input to generate a candidate adversarial input that maximizes loss in identifying the image by the classifier;
query the neural network classifier to determine a classifier prediction for the candidate adversarial input;
compute a score for the classifier prediction;
accept the candidate adversarial input as a successful adversarial attack responsive to the classifier prediction being incorrect; and
reject the candidate adversarial input responsive to the classifier prediction being correct.

10. The computational system of claim 9, wherein the processor is further programmed to add the image perturbation to the original input using a fast gradient sign method.

11. The computational system of claim 10, wherein the fast gradient sign method utilizes a pre-specified $L_\infty$ perturbation bound to adding the image perturbation to the original input.

12. The computational system of claim 9, wherein the Markov random field parameters include a first parameter that governs diagonal terms, and a second parameter that governs adjacent pixels corresponding to indices that are neighboring in an image.

13. The computational system of claim 9, wherein the values of the parameters are inferred using Newton's method.

14. The computational system of claim 9, wherein a predefined maximum number of queries of the classifier are utilized to estimate the gradients.

15. A non-transitory computer-readable medium comprising instructions for performing a single-step adversarial attack on a neural network classifier that, when executed by a processor, cause the processor to:
identify Markov random field parameters to use for covariance modeling of correlation between gradient terms of a loss function of the classifier;
sample a subset of images, from a dataset of images, according to a normal distribution to estimate the gradient terms;
use black-box gradient estimation to infer values of the parameters of the Markov random field according to the sampling;
generate Fourier basis vectors from the inferred values;
perturb an original image using the Fourier basis vectors to obtain loss function values;
obtain an estimate of a gradient from the loss function values;
create an image perturbation using the estimated gradient;
add the image perturbation to an original input to generate a candidate adversarial input that maximizes loss in identifying the image by the classifier;
query the neural network classifier to determine a classifier prediction for the candidate adversarial input;
compute a score for the classifier prediction;
accept the candidate adversarial input as a successful adversarial attack responsive to the classifier prediction being incorrect; and
reject the candidate adversarial input responsive to the classifier prediction being correct.

16. The medium of claim 15, further comprising instructions that, when executed by the processor, cause the processor to add the image perturbation to the original input using a fast gradient sign method.

17. The medium of claim 16, wherein the fast gradient sign method utilizes a pre-specified $L_\infty$ perturbation bound to adding the image perturbation to the original input.

18. The medium of claim 15, wherein the Markov random field parameters include a first parameter that governs diagonal terms, and a second parameter that governs adjacent pixels corresponding to indices that are neighboring in an image.

19. The medium of claim 15, wherein the values of the parameters are inferred using Newton's method.

20. The medium of claim 15, wherein a predefined maximum number of queries of the classifier are utilized to estimate the gradients.

\* \* \* \* \*